Dec. 5, 1939.  H. H. GUSTIN  2,181,888
FLEXIBLE COUPLING
Filed May 27, 1938  2 Sheets-Sheet 1
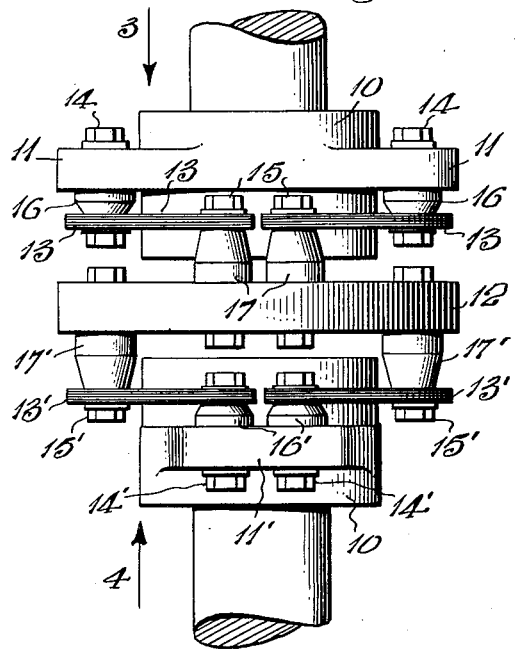
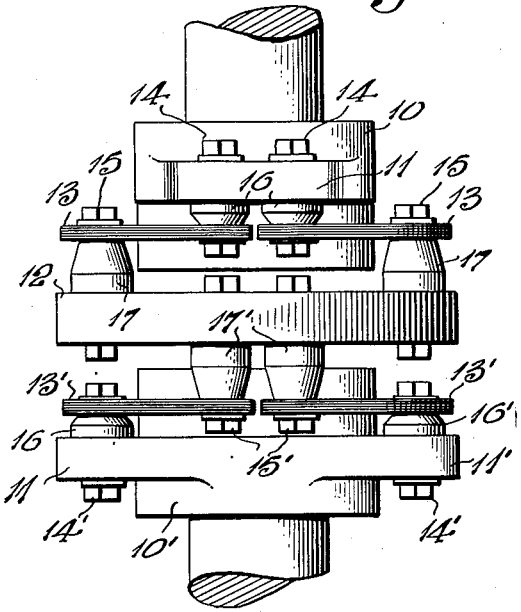
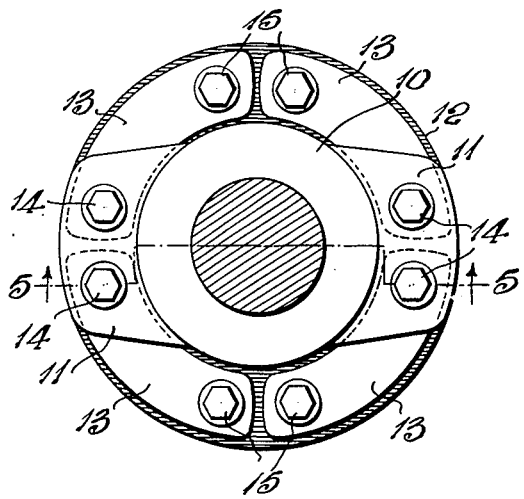
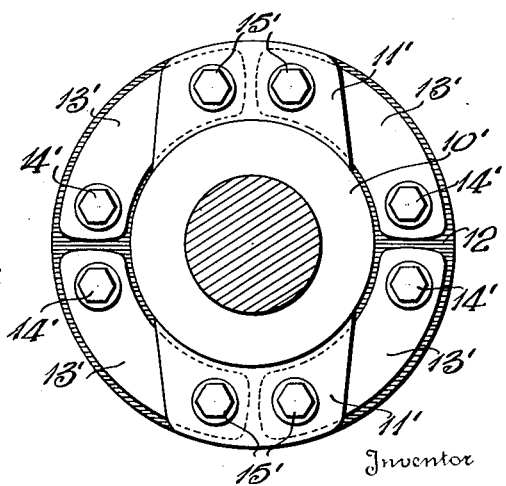
Inventor
Harold H. Gustin
WITNESS
H. Woodard
By H. R. Wilson &co
Attorneys Dec. 5, 1939.  H. H. GUSTIN  2,181,888

FLEXIBLE COUPLING

Filed May 27, 1938  2 Sheets-Sheet 2

WITNESS
H. Woodard

Inventor
Harold H. Gustin
By H. B. Wilson & Co.
Attorneys

Patented Dec. 5, 1939

2,181,888

UNITED STATES PATENT OFFICE 2,181,888

FLEXIBLE COUPLING

Harold Horatio Gustin, Warren, Pa.

Application May 27, 1938, Serial No. 210,465

4 Claims. (Cl. 64—15)

The invention aims to provide a new and improved coupling for connecting two shafts to rotate as a single unit, whether said shafts be in true axial alinement, substantially alined but relatively offset to some extent, or substantially alined but at a widely obtuse angle with respect to each other, the coupling being so constructed as to yield in all required ways regardless of the relation of the two shafts and even if some end play exists in one shaft with respect to the other.

In carrying out the above end, resilient links are provided to operatively connect two shaft-carried hub members with an intermediate member, and a further object is to provide a novel construction whereby relatively short bolts may be employed to secure the ends of the links, and whereby any links which may become damaged may be quickly and easily removed and replaced with others.

A still further object is to provide a construction which is comparatively simple and inexpensive, yet efficient, reliable and durable.

With the foregoing in view, the invention resides in the novel subject matter hereinafter described and claimed, description being accomplished by reference to the accompanying drawings.

Figs. 1 and 2 are side elevations at right angles.

Figs. 3 and 4 are end elevations as indicated by the arrows 3 and 4 of Fig. 1.

Figure 5:
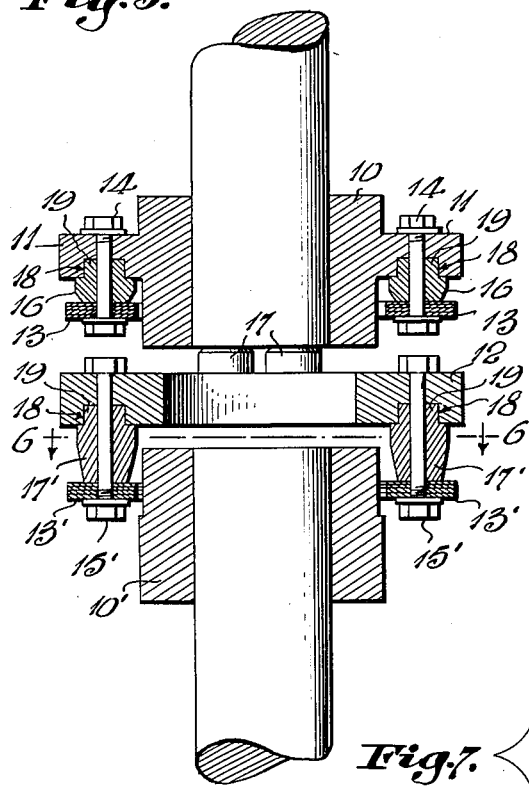
Fig. 5 is a sectional view on line 5—5 of Fig. 3.
Figure 7:
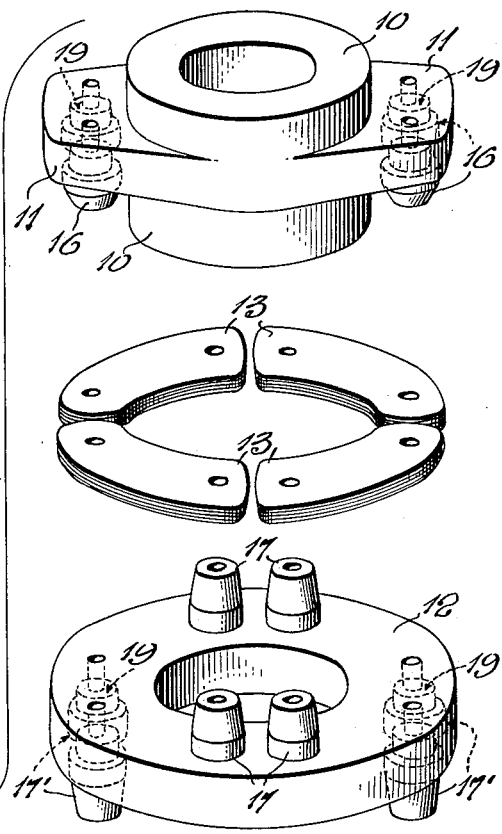
Fig. 7 is a disassembled perspective view.
Figure 6:
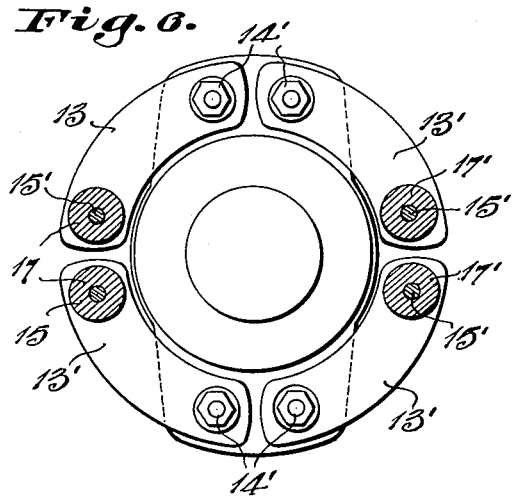
Fig. 6 is a sectional view on line 6—6 of Fig. 5.

A preferred construction has been illustrated and will be rather specifically described, with the understanding, however, that variations may be made within the scope of the invention as claimed.

Two shaft-engaging hubs 10 and 10' are provided, said hub 10 being provided with two radial arms 11 projecting from diametrically opposite sides thereof, and the hub 10' being provided with two arms 11' corresponding to said arms 11. The arms 11 are spaced apart 90° from the arms 11'.

A disk 12, preferably of annular form, is axially alined with and interposed between the hubs 10 and 10'. A plurality of resilient links are provided to connect this disk 12 with the arms 11 and 11', said links being disposed in two series of four each. The links of one series are denoted at 13, connecting the arms 11 with the disk 12, and those of the other series are shown at 13', connecting said disk 12 with the arms 11'. Short bolts 14 connect the links 13 with the arms 11 and other short bolts 14' connect the links 13' with the arms 11'. Other short bolts 15 connect the links 13 with the disk 12 and still other short bolts 15' connect the links 13' with the disk 12. Half of the number of the links 13 extend circumferentially from the arms 11 in the direction of rotation of the coupling, and the others of said links 13 extend circumferentially from said arms in the opposite direction. The same is true of the links 13' with respect to the arms 11'. The coupling is thus suited for driving in either direction, half the number of links taking a pulling strain and doing the principal driving while the others receive a pushing strain but stand in readiness for reverse action should it be necessary to reverse the direction of rotation. The links allow all necessary relative movements of the two shaft sections and at all times establish a positive driving connection between them, aided of course, by the disk 12. Each link is preferably formed from a plurality of thicknesses of sheet steel.

To aid in properly securing the links 13 to the arms 11 and the links 13' to the arms 11', I preferably provide each arm 11 with two inwardly projecting circumferentially spaced bosses 16 and provide each arm 11' with two corresponding bosses 16'. To aid in connecting the links with the disk 12, I provide one side of said disk with two pairs of bosses 17 to abut the links 13, and provide the other side of said disk with two pairs of bosses 17' to abut the links 13'. It will be observed that in the construction shown, the bosses 17' are in alinement with the bosses 16 and the bosses 17 are in alinement with the bosses 16'. The various bosses may if desired be formed separately from the parts by which they are carried and connected with said parts by providing the latter with sockets 18 receiving reduced ends 19 of the bosses. These bosses, the parts by which they are carried, and the links 13 and 13' are of course provided with suitably formed openings through which the various bolts pass in such manner as to permit any bolt to be readily removed when required, allowing any damaged link or link section to be replaced with another whenever necessary.

Excellent results may be obtained from the details shown and described and they are, therefore, preferably followed. However, within the scope of the invention as claimed, variations may be made. While the member 12 is referred to as a disk, it is obvious that it need not be strictly in the form of a disk, but could be an intermediate member of other appropriate shape.

I claim:

1. A flexible coupling comprising two spaced axially alined shaft-engaging hubs, each provided with equally spaced radial arms, the arms of one hub being staggered with respect to those of the other hub, each of said arms being provided with a pair of circumferentially spaced openings; an inherently rigid member axially alined with and disposed between said hubs, said member being provided with circumferentially spaced pairs of circumferentially spaced openings alined with the pairs of openings of said arms; flat resilient links disposed in two circular series, one of said series being disposed at one side of said member and the other series at the other side thereof, the links of each series being slightly spaced apart circumferentially, one end of each link being provided with an opening alined with one of a pair of the openings in said arms, the other end of the link being provided with an opening alined with one of a pair of the openings in said member, and pairs of bolts passing through the alined openings and securing the circumferentially spaced links to said arms and member, with half the number of links extending from said arms in the direction of rotation of the coupling and the remainder extending from said arms in the opposite direction.

2. A structure as specified in claim 1; said bolts being so arranged that those of any link may be removed without disturbing any other parts of the coupling.

3. A flexible coupling comprising spaced axially alined shaft-engaging hubs each provided with equally spaced radial arms, the arms of one hub being staggered with respect to those of the other hub, each of said arms being provided at its inner side with a pair of circumferentially spaced bosses; an inherently rigid member axially alined with and disposed between said hubs, each side of said member being provided with circumferentially spaced pairs of circumferentially spaced bosses, the pairs of bosses on either side of said member being alined with the pairs of bosses on the arms at the other side of said member; flat resilient links disposed in two circular series, one of said series being at one side of said member and the other series at the other side thereof, the links of each series being slightly spaced apart circumferentially, one end of each link being disposed against one of a pair of the arm-carried bosses and the other end of the link being disposed against one of a pair of the member-carried bosses, and pairs of bolts securing said link ends against said bosses with half the number of links extending from said arms in the direction of rotation of the coupling and the remainder extending from said arms in the opposite direction.

4. A structure as specified in claim 3; said bolts being so arranged that those of any link may be removed without disturbing any other parts of the coupling.

HAROLD HORATIO GUSTIN.